Aug. 17, 1926.
H. W. JONES
1,596,188
CONTACT MEANS FOR BATTERY CELLS
Filed Oct. 27, 1923
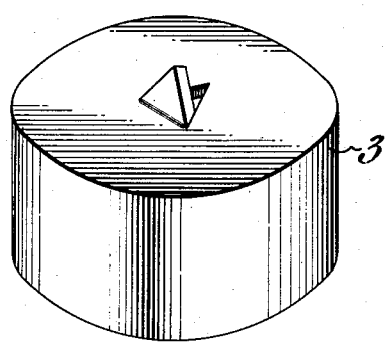
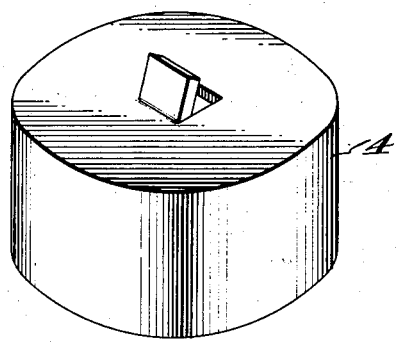
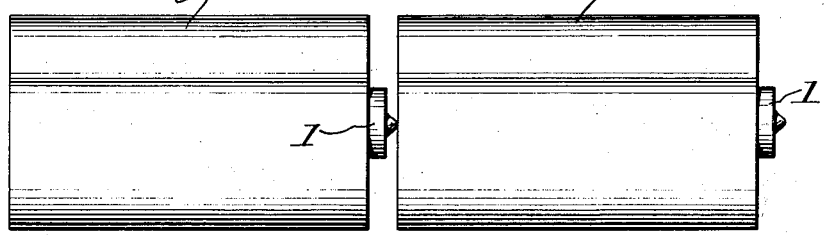
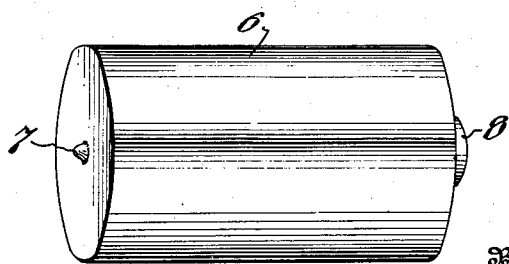

Patented Aug. 17, 1926.

1,596,188

UNITED STATES PATENT OFFICE.

HOMER W. JONES, OF FLUSHING, NEW YORK, ASSIGNOR TO NATIONAL CARBON COMPANY, INC., A CORPORATION OF NEW YORK.

CONTACT MEANS FOR BATTERY CELLS.

Application filed October 27, 1923. Serial No. 671,156.

The invention is a dry cell electrode comprising a metallic member provided with a projecting point or edge adapted to give a low-resistance contact with an abutting surface. The invention may be variously applied, but ordinarily the contact-making point or edge will be formed on the brass cap of carbon rod electrodes, or on the bottom of zinc container electrodes.

Small dry cells, such as those for flashlights, are customarily provided with a brass cap on the exposed end of the carbon rod electrode. Connection is made by bringing this cap against another conductor, which is particularly always of metal, being for example the bottom of the zinc container electrode of another cell or the central terminal of a miniature incandescent lamp. When both the brass cap and the abutting metal are clean and free from products of corrosion or other non-conducting materials such as the pitch and wax used in sealing dry cells, a good electrical connection is easily effected, but if either contacting part carries a film of non-conductive material, a high-resistance connection or an open circuit is the result.

In accordance with one embodiment of my invention, contact between the carbon electrode and adjacent conductor is limited to a very small surface, by providing the electrode with a plate having a projecting portion on which a point, edge, or other small area is formed.

The invention will be further described in connection with the accompanying drawing in which—

Fig. 1 is a section of a carbon rod electrode embodying my invention,

Fig. 2 is an enlarged perspective view of a modified form of cap to be applied to a carbon rod electrode, Fig. 3 is an enlarged perspective view of another modification of the cap, Fig. 4 is a view of two cells provided with my novel electrodes and connected to form a battery, and Fig. 5 is a perspective view of a zinc container electrode having a projection on its bottom.

In the form of the invention shown in Fig. 1, the projection is produced by a punching operation performed on the plate forming the top of the electrode cap 1, without severing the metal. In this case the projection takes the form of a small cone 2.

In Fig. 2 I have shown a modified cap 3, wherein the material of the cap is severed along a V and the point of the V is turned upward.

Fig. 3 shows a cap 4 which differs from that of Fig. 2 in that the metal is severed along a U, the contact being a short edge instead of a point.

A battery of cells 5, each having a contact making projection on caps 1, is illustrated in Fig. 4.

Instead of forming a projection upon the electrode cap, the bottom of the zinc cup may be formed centrally to produce a point or edge adaptetd to engage a conductor. This embodiment of the invention is illustrated in Fig. 5, in which 6 is a zinc cup having conical central protuberance 7. The carbon electrode has a plane brass cap 8. This will be in contact with the protuberance on the base of a superposed cell, when the cells are stacked for service.

Separate contact-making points or the like may be secured to the brass cap or zinc cup, but it is generally preferable to form them by a stamping or similar operation from the metal of the cap or cup. A plurality of points, arranged in any suitable way, may be provided if desired.

With a contact member in accordance with my invention, any thin film of non-conducting material is ineffectual to prevent good electrical contact. The pressure of the cell against the abutting conductor is localized on such a small area that the non-conducting film is pierced and the metal underneath is reached. A relative movement between the contacting parts is of course still more effective in bringing together the metals, any insulating film being scraped away by such movement. In handling flashlights and the like, a relative motion between the cells is generally produced due to the fact that the cells do not fit the case exactly, and this motion, though slight, is sufficient to ensure perfect electrical contact at all times.

My invention is subject to many modifications, and is limited only by the appended claims.

I claim:

1. A cylindrical battery cell having an electrode provided with a projection of angular longitudinal section, said section being so oriented as to present an apex to a cylindrical cell disposed coaxially with the cell first mentioned, substantially as and for the purpose described.

2. A cylindrical battery cell having a carbon rod electrode provided with a projection of angular longitudinal section, said section being so oriented as to present an apex to a cylindrical cell disposed coaxially with the cell first mentioned, substantially as and for the purpose described.

3. A cylindrical battery cell having an electrode provided with a substantially rigid projection of angular longitudinal section, said section being so oriented as to present an apex to a cylindrical cell disposed coaxially with the cell first mentioned, substantially as and for the purpose described.

In testimony whereof, I affix my signature.

HOMER W. JONES.